E. N. SMITH.
WHIFFLETREE FENDER.
APPLICATION FILED NOV. 7, 1908.
924,389.
Patented June 8, 1909.
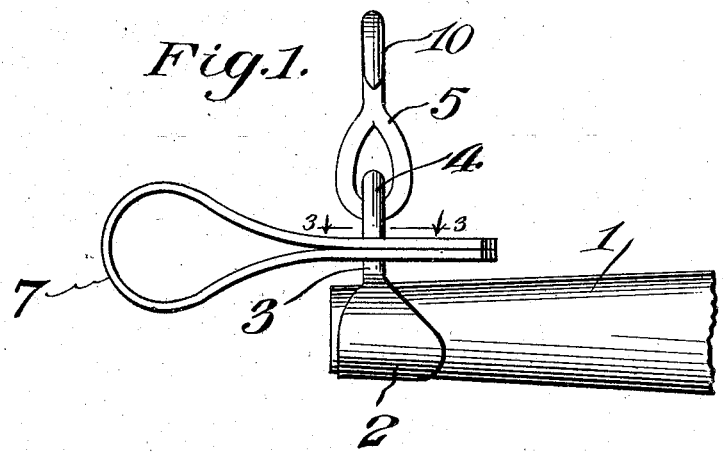
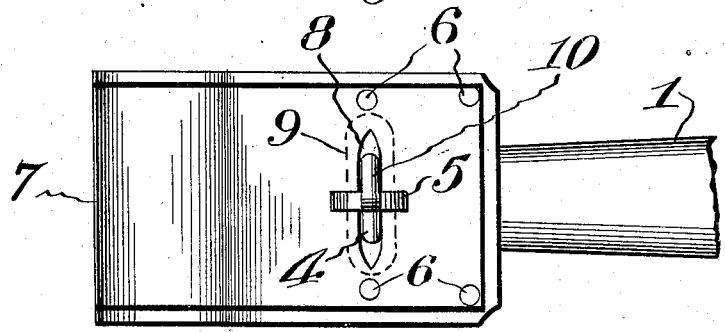
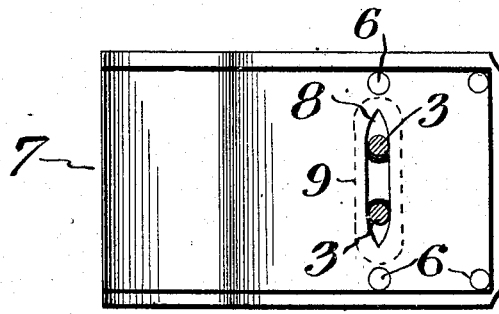
Inventor,
Etta N. Smith.
Witnesses:
By Victor J. Evans
Attorney

UNITED STATES PATENT OFFICE.

ETTA N. SMITH, OF FREEWATER, OREGON.

WHIFFLETREE-FENDER.

No. 924,389.     Specification of Letters Patent.     Patented June 8, 1909.

Application filed November 7, 1908. Serial No. 461,532.

*To all whom it may concern:*

Be it known that I, ETTA N. SMITH, a citizen of the United States of America, residing at Freewater, in the county of Umatilla and State of Oregon, have invented new and useful Improvements in Whiffletree-Fenders, of which the following is a specification.

This invention relates to whiffletree fenders, the object of the same being to provide simple and efficient means for preventing the outer ends of the whiffletrees from injuring fruit or other trees while plowing or cultivating the ground.

It is a well known fact that whiffletrees injure fruit trees by removing the bark and oftentimes scoring the tree as the horses are driven through an orchard.

My invention has for its object to provide an attachment for the end of a whiffletree which will prevent the end of the same coming in contact with the bark of a tree.

The objects referred to may be attained by means of the construction illustrated in the accompanying drawing, in which,—

Figure 1 is a plan view of the outer end of a whiffletree, showing my fender secured to the clip thereof. Fig. 2 is a front elevation of the same. Fig. 3 is a sectional view on the line 3—3 of Fig. 1, looking in the direction indicated by the arrows.

Referring to the drawing, the numeral 1 designates a whiffletree to which is secured at the outer ends a clip 2 which partially surrounds the whiffletree and is provided with extending shanks 3 which terminate in the loop 4. Connected to the loop is an ordinary draft hook 5.

My whiffletree fender consists of a strip of comparatively thick leather, the ends of said strip being brought together and connected by rivets 6, thus forming an enlarged loop 7. A slot 8 is formed through the two layers of the strap at a point preferably in line with two of the rivets 6. A line of stitches 9 surround the slot to prevent undue enlargement of the same. To secure the fender in place upon the clip 2 the slot 8 is passed over the bill 10 of the draft hook and turns upon the shank thereof and passed over the loop portion of said hook and from thence turned and passed over the loop 4 of the clip 2 until the shank portions 3 of said clip occupy positions near the opposite ends of the slot 8, thus serving to hold the loop portion 7 substantially in alinement with the whiffletree 1.

In use the loop 7 may strike a tree without injuring it and will fend off the whiffletree 1, the latter, of course, being pivotally connected to a doubletree or draft bar.

From the foregoing, it will be obvious that while my invention is of simple construction, it serves its purpose well and can be produced at slight cost and readily connected to whiffletrees of ordinary construction.

I claim:—

1. A whiffletree fender comprising a strip of leather bent into the form of a loop and the ends of the strip riveted together and provided with a slot, in combination with a whiffletree clip having oppositely disposed shanks for holding said loop in alinement with the whiffletree.

2. A whiffletree fender comprising a strip of flexible material bent into the form of a loop, the ends of which are riveted together, said loop being provided with a slot near the riveted ends in line with two of the rivets, in combination with a whiffletree clip to which said loop is secured, said clip being provided with spaced shanks to hold the loop in alinement with the whiffletree.

In testimony whereof I affix my signature in presence of two witnesses.

ETTA N. SMITH.

Witnesses:
    C. H. SMITH,
    FLOSSA BARTLETT.